United States Patent

Sollich

[11] 4,107,938
[45] Aug. 22, 1978

[54] METHOD OF AND APPARATUS FOR COOLING A COOKED CONFECTIONERY

[75] Inventor: Helmut Sollich, Kalletal, Germany

[73] Assignee: Sollich KG, Bad Salzuflen, Germany

[21] Appl. No.: 705,131

[22] Filed: Jul. 14, 1976

[30] Foreign Application Priority Data

Jul. 31, 1975 [DE] Fed. Rep. of Germany ....... 2534131

[51] Int. Cl.² .......................... A23G 3/12; F25C 1/14
[52] U.S. Cl. ........................................ 62/71; 62/346; 425/224; 426/515
[58] Field of Search ........................ 62/346, 354, 71; 425/363, 223, 224, 367; 165/91, 186, 190; 264/212, 237; 426/515, 524, 660, 558; 259/187, 188, 189; 99/455

[56] References Cited

U.S. PATENT DOCUMENTS

| 1,469,658 | 10/1923 | McCrohan | 425/367 |
| 2,071,035 | 2/1937 | Jenett | 425/223 |
| 2,678,465 | 5/1954 | Schnuck et al. | 425/367 |
| 2,771,388 | 11/1956 | Rocky et al. | 425/363 |
| 2,898,873 | 8/1959 | Cale | 425/367 |
| 3,020,164 | 2/1962 | Forkner | 426/565 |
| 3,547,891 | 12/1970 | Snead et al. | 264/237 |
| 3,850,561 | 11/1974 | Bensdorp | 425/223 |
| 3,936,258 | 2/1976 | Lake | 425/367 |
| 3,964,848 | 6/1976 | Wockener | 425/224 |
| 4,038,012 | 6/1977 | Sander | 425/363 |

Primary Examiner—William E. Wayner
Attorney, Agent, or Firm—Browdy & Neimark

[57] ABSTRACT

A method and apparatus for depositing a hot mass of a confectionery to be cooled in a thin sheet on consecutively associated cooling cylinders upon which the underside and top side of the sheet, travelling in a substantially S-shaped path, are alternately cooled to the temperature required for further processing.

4 Claims, 2 Drawing Figures

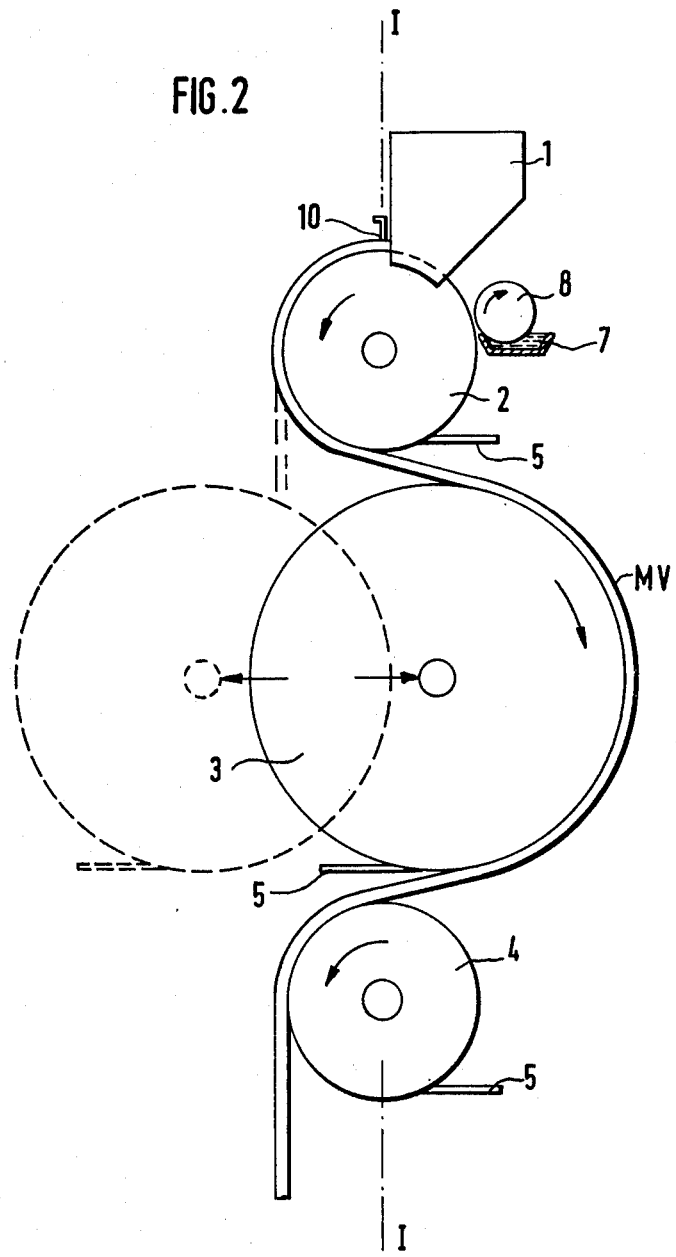

METHOD OF AND APPARATUS FOR COOLING A COOKED CONFECTIONERY

FIELD OF THE INVENTION

The invention relates to a method of cooling a cooked sugar mass, such as a hard boiled sugar mass, toffee, and the like, as well as to apparatus for performing the proposed method in an economical way.

BACKGROUND OF THE INVENTION

In the confectionery manufacturing industry it was hitherto the practice to cook the sugar masses for processing, to mix them as required, and then to cool them on large cooling tables until their temperature was appropriate for further processing to hard boiled sweets or other confections. Instead of cooling tables, steel belts are also used on which the hot mass is conveyed through cooling chambers. This is an improvement and time-consuming process and requires a considerable amount of floor space and large numbers of workers.

SUMMARY OF THE INVENTION

It is therefore an object of the invention to eliminate these defects and to devise a method, as well as apparatus for performing the method of cooling cooked sugar masses in a manner permitting the cooling process to be completed in a simple way, quickly and with the elimination of expensive cooling equipment and large numbers of workers.

According to the invention this is achieved by depositing the hot mass in the form of a thin sheet on consecutively associated cooling cylinders upon which the underside and the top of the sheet, travelling in a substantially S-shaped path, are alternately cooled to the temperature required for further processing. During the process of cooling, the sheet is preferably carried on the surface of the cooling cylinders in the S-shaped path from above downwards in an overall vertical direction and thus cooled until the sheet automatically detaches itself from each cylinder surface by its own weight. The cooling temperature, the speed of revolution of the cylinders and the rate of deposition by weight of the mass are so matched that the sheet will drop off the underside of the first cylinder without the assistance of doctor blades or the like, with its as yet uncooled outside face down, onto the surface of the associated cooling cylinder underneath to be cooled thereon to completion. The cooling elements associated with the cooling cylinders may be so designed that the sheet is subjected to a shock cooling effect on the cylinder.

Apparatus for performing the method may comprise substantially a first cooling cylinder revolving about a horizontal axis underneath a feed means for the mass and at least one further cooling cylinder following the first for receiving the sheet dropping off the first cooling cylinder in such manner that the surface of the sheet which had been on the outside drops face down onto the surface of the second cylinder. The cooling cylinders may have different diameters. Moreover, to enable the respective envelopment angles to be varied, the cooling cylinders may be relatively displaceably mounted, and they may also be provided with variable speed drives so that their circumferential speeds can be independently adjustably varied.

BRIEF DESCRIPTION OF THE INVENTION

The thought which underlies the invention and which admits of diverse embodiments will be illustratively described with reference to the accompanying drawings in which FIG. 1 is a diagrammatic representation of a cooling device comprising two consecutively associated cooling cylinders of different diameters, and FIG. 2 is a different form of construction of such a device in which a final guide roller is associated with the cooling cylinders.

DESCRIPTION OF THE PREFERRED EMBODIMENTS

Figure 1:
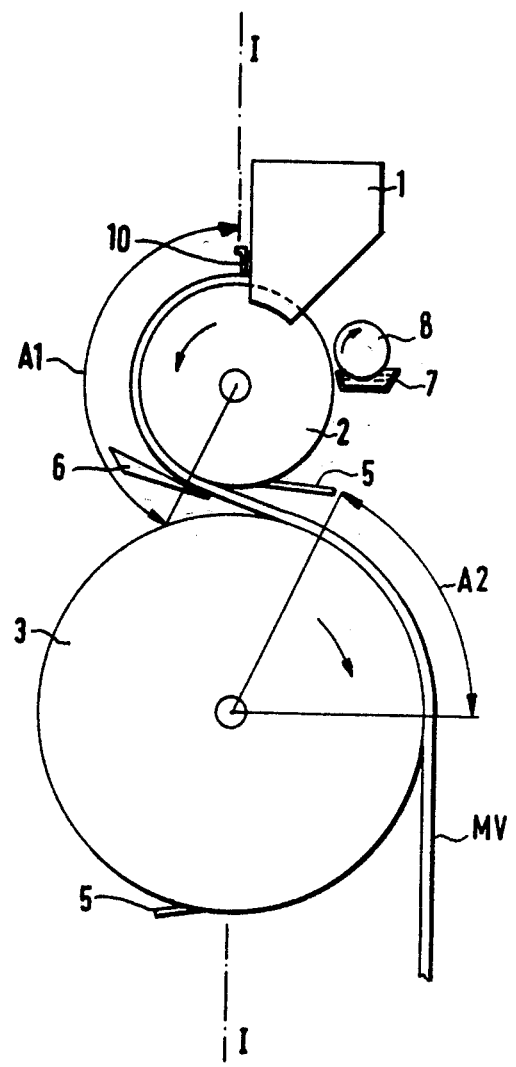

Referring to FIG. 1 there are provided underneath a feed hopper for the sugar mass two cooling cylinders 2 and 3 of different diameters mounted to rotate in the arrowed directions about axes contained substantially in a vertical plane I — I and located to leave a gap between the respective cylinder surfaces. The cooling elements associated with the cooling cylinders and other cooling equipment are not shown in the drawing. The sugar mass leaves the feed hopper 1 in the form of a thin sheet MV which runs onto the circumferential surface of the first cooling cylinder 2. The sheet sticks to the surface until its underside has sufficiently cooled for the sheet to detach itself and to drop off the bottom part of the cylinder 2 by its own weight. The as yet uncooled outside surface of the sheet therefore drops face down onto the circumference of the following larger diameter cooling cylinder 3 on which the sheet of sugar mass is wholly cooled. Doctor blades 5 which make contact with the circumference of the two cylinders 2 and 3 are merely provided for safety, as are other accessory guide members 6.

A1 and A2 are the envelopment angles within which the sugar mass remains in contact with the surfaces of cylinders 2 and 3. By the provision of an additional guide roller 4 below the second cooling cylinder 3 the envelopment angle can be further increased. In any event, the cooling temperature and speed of rotation of the cylinders can be arbitrarily varied. Moreover, a sliding gate 10 may be provided to control the rate of supply of the sugar mass from the feed hopper 1. Finally, a parting oil may be applied from a trough 7 by means of a transfer roller 8 to the circumference of the cooling cylinders to assist the cooling sheet in detaching itself from the cylinders.

In the embodiment according to FIG. 2 the axis of revolution of the major diameter cooling cylinder is shifted out of the vertical plane I — I for the purpose of increasing the envelopment angle and of thereby controlling the time the ribbon is exposed to the cooling effect.

I claim:

1. A method for cooling a cooked confectionery mass, comprising:

continually depositing a thin sheet of hot confectionery mass onto the upper side of a cooling cylinder rotating about a horizontal axis, the cooling temperature of the cylinder, the speed of revolution of the cylinder and the rate of deposition by weight of the mass being so chosen as to provide sufficient cooling of the side of the mass in contact with the cylinder for the sheet of confectionery mass to detach itself and drop off the bottom part of the cylinder by force of gravity, the other side of the mass remaining substantially uncooled; and providing a second cooling cylinder positioned below the first cylinder and rotating in a direction opposite therefrom, in such a position as to receive the sheet of mass which has dropped off of the first cylinder, with the uncooled side of the sheet of mass in contact with the surface of the second cooling cylinder, and to carry the sheet of mass along the circumference thereof, the cooling temperature and the speed of rotation of the second cooling cylinder and the size and position thereof relative to the first cooling cylinder being chosen as to provide sufficient cooling of the mass to completely cool the confectionery mass to the temperature required for further processing.

2. A method in accordance with claim 1, wherein the first and second cylinders have horizontal rotational axes, both of which are located in a vertical plane.

3. A method according to claim 1 wherein the sheet of confectionery mass is subjected to a shock cooling effect on at least one of the cooling cylinders.

4. Apparatus for performing the method according to claim 1 comprising, a first cooling cylinder revolving about a horizontal axis underneath a feed means for the mass (1) and at least one further cooling cylinder following said first cylinder for receiving the sheet dropping off the first cooling cylinder in such manner that the surface of the sheet which had been on the outside drops face down onto the surface of the second cylinder.

* * * * *